(12) United States Patent
Galkin

(10) Patent No.: US 9,027,741 B2
(45) Date of Patent: May 12, 2015

(54) TRANSPORT SYSTEM FOR SHEET MATERIAL

(75) Inventor: Andrey Galkin, St. Petersburg (RU)

(73) Assignee: Giesecke & Devrient GmbH, Munich (DE)

( * ) Notice: Subject to any disclaimer, the term of this patent is extended or adjusted under 35 U.S.C. 154(b) by 280 days.

(21) Appl. No.: 13/521,836

(22) PCT Filed: Jan. 12, 2011

(86) PCT No.: PCT/EP2011/000104
§ 371 (c)(1),
(2), (4) Date: Dec. 5, 2012

(87) PCT Pub. No.: WO2011/085975
PCT Pub. Date: Jul. 21, 2011

(65) Prior Publication Data
US 2013/0068593 A1  Mar. 21, 2013

(30) Foreign Application Priority Data
Jan. 13, 2010 (RU) ................................ 2010100906

(51) Int. Cl.
*B65G 15/58* (2006.01)
*B65H 5/22* (2006.01)
*B65H 29/58* (2006.01)

(52) U.S. Cl.
CPC ............... *B65G 15/58* (2013.01); *B65H 5/224* (2013.01); *B65H 5/228* (2013.01); *B65H 29/58* (2013.01); *B65H 2301/44734* (2013.01); *B65H 2301/44735* (2013.01); *B65H 2406/12* (2013.01); *B65H 2406/323* (2013.01)

(58) Field of Classification Search
USPC ........................... 198/689.1, 571, 572; 406/88
See application file for complete search history.

(56) References Cited

U.S. PATENT DOCUMENTS

| 3,608,895 | A | | 9/1971 | Kalven | |
|---|---|---|---|---|---|
| 5,295,586 | A | * | 3/1994 | Chesnutt et al. | 209/552 |
| 5,441,252 | A | | 8/1995 | Hommes | |
| 5,605,217 | A | * | 2/1997 | Risley et al. | 198/453 |
| 5,668,307 | A | * | 9/1997 | Wade | 73/40.7 |
| 5,853,441 | A | * | 12/1998 | Groen et al. | 55/350.1 |
| 6,170,645 | B1 | * | 1/2001 | Mitchell | 198/816 |
| 7,704,019 | B2 | * | 4/2010 | Toda et al. | 406/88 |
| 8,336,870 | B2 | * | 12/2012 | Kobayashi | 271/10.01 |

FOREIGN PATENT DOCUMENTS

| DE | 8717360 U1 | 1/1989 |
|---|---|---|
| EP | 2042458 A2 | 4/2009 |

OTHER PUBLICATIONS

International Search Report and Written Opinion for PCT/EP2011/000104, May 31, 2011.

* cited by examiner

*Primary Examiner* — Gene Crawford
*Assistant Examiner* — Lester Rushin
(74) *Attorney, Agent, or Firm* — Workman Nydegger

(57) ABSTRACT

The invention is related to a transport system for sheet material including a conveyor belt charged with a vacuum. The transport system includes a vacuum chamber providing the vacuum to charge the conveyor belt while moving along the vacuum chamber in a transport direction, wherein the conveyor belt is permeable to air by recesses having specified distances from each other, and air nozzles arranged at a deflection position inside the vacuum chamber. The specified distances from each other correlate with the distances of the recesses in the conveyor belt to allow pressurized air charged to the air nozzles to pass through the recesses in the conveyor belt.

17 Claims, 3 Drawing Sheets

TRANSPORT SYSTEM FOR SHEET MATERIAL

FIELD OF THE INVENTION

The invention is related to a transport system for sheet material comprising a conveyor belt charged with a vacuum.

BACKGROUND OF THE INVENTION

Transport systems for sheet material comprising a conveyor belt charged with a vacuum are known form the state of the art. These transport systems are built up by a vacuum chamber and a conveyor belt moving along the vacuum chamber. The vacuum chamber is coupled to a vacuum pump which evacuates the chamber to produce a vacuum or low pressure inside the chamber. The conveyor belt covers one or more openings in the vacuum chamber which charge the belt with the vacuum. Via bores or other recesses in the belt the vacuum or low pressure inside the chamber produces suction forces which adhere the sheet material to the conveyor belt for transport.

The transport systems for sheet material comprising a conveyor belt charged with a vacuum known form the state of the art suffer form the drawback that they are complex and expensive because of the fact that vacuum pumps are used. The known transport systems are in addition inflexible with respect to allowing changes in the direction of transport or changes of the orientation of the sheet material being transported.

SUMMARY OF THE INVENTION

Therefore one aspect of the invention is to provide a transport system for sheet material comprising a conveyor belt charged with a vacuum which allows changing the direction of transport or the orientation of the sheet material being transported or both a change of transport direction and orientation. It is preferred that the invention can be used for high speed transport of sheet material.

It is another aspect of the invention to provide a transport for sheet material comprising a conveyor belt charged with a vacuum which allows an inexpensive and not complex realization which in particular can be used for changing the direction of transport or the orientation of the sheet material or both a change of transport direction and orientation.

In one embodiment of the invention there is provided a transport system for sheet material comprising a conveyor belt charged with a vacuum, and a vacuum chamber providing the vacuum to charge the conveyor belt while moving along the vacuum chamber in a transport direction, wherein the conveyor belt is permeable to air by recesses having specified distances to each other, and air nozzles arranged at a deflection position inside the vacuum chamber, wherein the air nozzles are arranged to have specified distances to each other correlating with the distances of the recesses in the conveyor belt, to allow pressurized air charged to the air nozzles to pass through the recesses in the conveyor belt.

The transport system allows changing the direction of transport or the orientation of the sheet material being transported or both a change of transport direction and orientation at the defection position at high transport speeds.

As the change of transport direction and/or orientation of the sheet material are effected without mechanical means, no wear of the sheet material is caused in the transport system. As a second positive aspect of not using mechanical means for changing the direction of transport and/or the orientation of the sheet material transported, the occurrence of jammed sheet material is reduced considerably. In summery the transport system allows a more careful and more rapid transportation and easy change of transport direction and/or orientation of sheet material. This is caused by deflecting the sheet material by pressurized air producing a force which is applied to the whole surface or a considerable part of the surface of the sheet material, as compared to mechanical systems for deflection of sheet material which only apply a deflection force to the front edge of the sheet material seen in the direction of transport.

In another embodiment of the invention there is provided a transport system for sheet material, comprising a conveyor belt charged with a vacuum, and a vacuum chamber providing the vacuum to charge the conveyor belt while moving along the vacuum chamber in a transport direction, wherein at least one fan is attached to a housing forming the vacuum chamber to produce the vacuum.

The transport system allows an inexpensive and not complex realization of a transport system for sheet material comprising a conveyor belt charged with a vacuum, by using inexpensive fans instead of vacuum pumps to produce a vacuum or low pressure within the vacuum chamber for charging the conveyor belt.

BRIEF DESCRIPTION OF DRAWINGS

The figures show

DETAILED DESCRIPTION OF THE INVENTION

Figure 1:
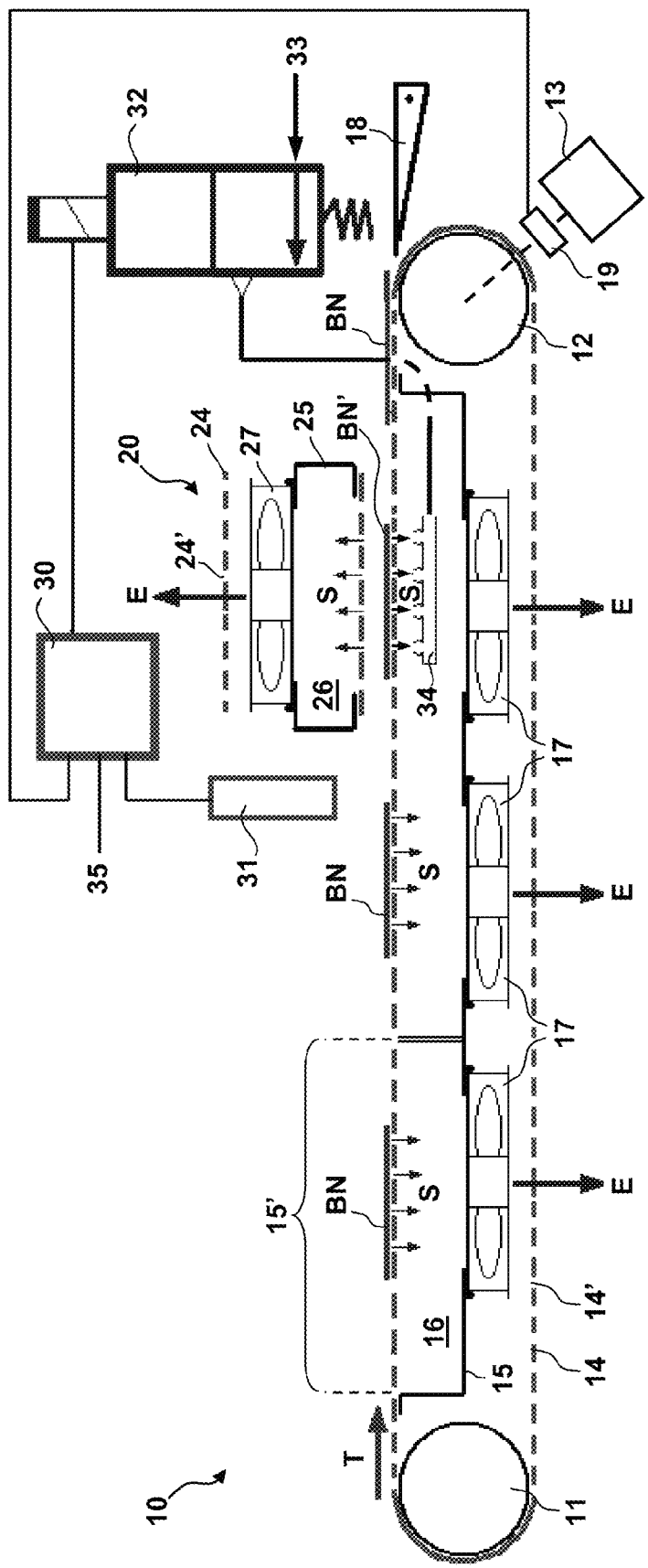
FIG. 1 a transport system for sheet material comprising a conveyor belt charged with a vacuum, in a first operating state, FIG. 2 the transport system for sheet material as shown in FIG. 1, in a second operating state, FIG. 3 the transport system for sheet material as shown in FIG. 1, in a three dimensional representation, and FIG. 4 an embodiment of air nozzles as used in the transport system for sheet material.

FIG. 1 shows a transport system for sheet material comprising a conveyor belt charged with a vacuum.

The transport system comprises a first conveyor 10 with a conveyor belt 14, which is permeable to air, e. g. by means of bores or recesses 14', and rollers 11 and 12, of which at least one is propelled by a drive 13. Between the two rollers 11 and 12 a vacuum chamber 16 is located. The chamber 16 can be formed a housing made of sheet metal 15. To create a vacuum or low pressure inside the chamber 16 one or more fans 17 can be used to exhaust air E form the chamber 16. The conveyor belt 14 is moving over one surface of the chamber 16 and seals one or more openings in the surface of the chamber 16. The conveyor belt 14 is charged with the vacuum inside the chamber 16 through the openings. Via the bores 14' the vacuum or low pressure in the chamber 16 produces suction forces S which adhere sheet material BN, BN' to the conveyor belt 14 for transport. The single sheet material BN, BN' is transported in parallel to its long edges in a direction of transport T and delivered to other parts 18 of the transport system.

Figure 3:
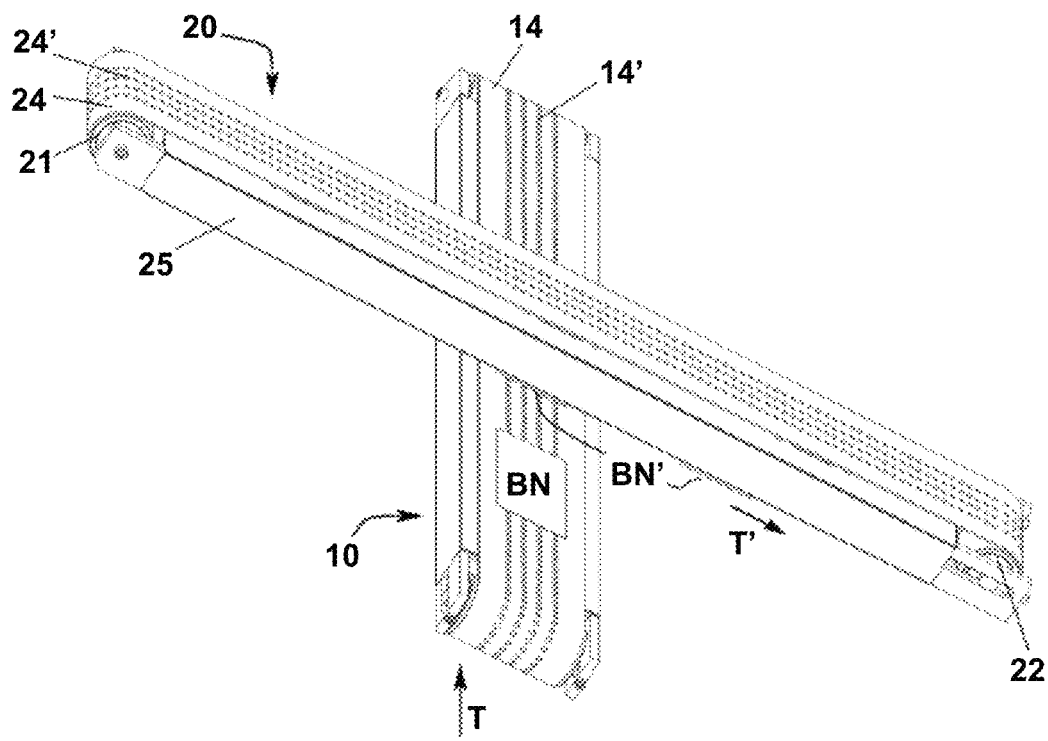

As can be seen better from FIG. 3, a second conveyor 20 is intersecting the first conveyor 10. First and second conveyor 10 and 20 are arranged to have a small distance from each other, e. g. less than 2 cm. The second conveyor 20 is constructed in the same way as the first conveyor 10, having rollers 21, 22, of which at least one is propelled by a drive (not shown), a conveyor belt 24 which is permeable to air, e. g. by means of bores or recesses 24', a chamber 26 which can be a housing made of sheet metal 25, and at least one fan 27, which exhausts air E form the chamber 26 to create a vacuum or low pressure inside the chamber 26.

In operation, as shown in FIG. 1, the sheet material BN is adhered to the conveyor belt 14 of the first conveyor 10 by the suction forces S produced by the fans 17. When sheet material BN' is passing the intersection with the second conveyor 20 the sheet material BN' will stay on the first conveyor 10, because in first and second conveyors 10 and 20 a vacuum of approximately the same strength is produced by the fans 16 and 26 and because of the two conveyors 10 and 20 are separated by the small distance mentioned above. If a change in the direction of movement or the orientation of the sheet material transported or both is required, the sheet material has to be handed over to another conveyor.

Figure 2:
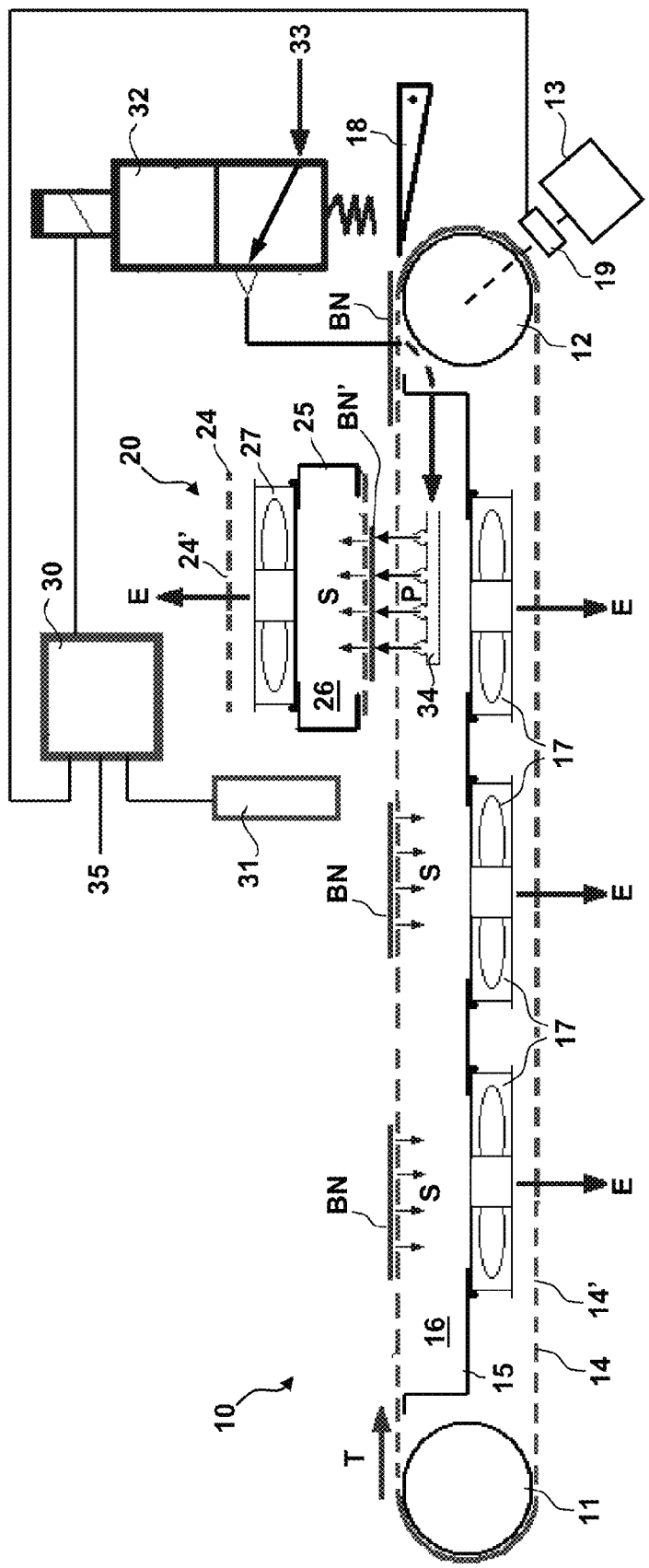

FIG. 2 shows the handing over of a piece of sheet material BN' to the second conveyor 20, whereby a change in the direction of movement and the orientation of the sheet material BN' is caused.

The first conveyor 10 comprises air nozzles 34 which are located inside the chamber 16. The air nozzles 34 are arranged with distances to each other matching the distances of the bores 14' of the conveyor belt 14. As can be seen from FIG. 2, there may be one air nozzle for each bore 14', but it is also possible to provide less air nozzles. The air nozzles 34 are arranged at the intersection of the first conveyor 10 and the second conveyor 20. The air nozzles 34 may occupy the whole area defined by the intersecting conveyors 10, 20 respectively their conveyor belts 14, 24. The area occupied by the air nozzles 34 should at least be equal to an area defined by the biggest piece of sheet material transported or a substantial part of it. By means of a valve 32, e. g. an electromagnetic or solenoid valve, pressurized air 33 can be charged to the air nozzles 34. To charge the pressurized air 33 at definite points in time to the air nozzles 34 a control means 30, e. g. a microcomputer, is used to control the valve 32.

Connected to the control means 30 are a detector 31 and a position encoder 19. The detector 31 can be a camera, e. g. a CCD-camera, or a simple photo sensor which detects the presence of a piece of sheet material BN being transported by the position of the detector 31, forming a means for position detection with the control means 30. The position encoder 19 may be a separate part as depicted or may also be part of the drive 13 or of one of the rollers 11, 12 of the first conveyor 10. With the help of the signal of the position encoder 19 the control means 30 can calculate the position of the bores 14' of the conveyor belt 14 while the conveyor belt 14 is moved, forming a means for alignment of the air nozzles 34 with the moving bores 14' of the conveyor belt 14.

Additionally a control line 35 is connected to the control means 30. The control line 35 can be used to input a command to the control means 30 to deflect a particular piece of sheet material BN' in order to change its direction of movement and/or its orientation. The command may be produced by a sheet material processing machine making use of the transport system, e. g. a banknote processing machine like a banknote sorter.

After the command to deflect a particular piece of sheet material BN' has been input to the control means 30 via control line 35 the control means 30 calculates the point in time the particular piece of sheet material BN' reaches the deflection position at the intersection of the first conveyor 10 and the second conveyor 20 by analyzing the signal of the detector 31. In addition the control means 30 calculates from the signal of the position encoder 19 when the air nozzles 34 are in alignment with the bores 14' of the conveyor belt 14. For the calculated point in time when the particular piece of sheet material BN' reaches the deflection position at the intersection of the conveyors 10, 20 and the alignment of bores 14' and air nozzles 34, the valve 32 is actuated by the control means 30 to charge the air nozzles 34 with the pressurized air 33. The air nozzles 34 are charged for a short time only, e. g. for 5 ms or less, because the movement of the conveyor belt 14 causes misalignment of the air nozzles 34 and the bores 14'. After the nozzles 34 and the bores 14' are aligned again, the air nozzles 34 can be charged again with pressurized air.

It is also possible to charge the air nozzles 34 with pressurized air 33 during the whole time the sheet material BN' to be deflected is present in the intersecting area of the first and second conveyors 10, 20.

As another alternative the nozzles 34 can be moved in synchronism with the bores 14' in the conveyor belt 14 while being charged with pressurized air 33.

Figure 4:
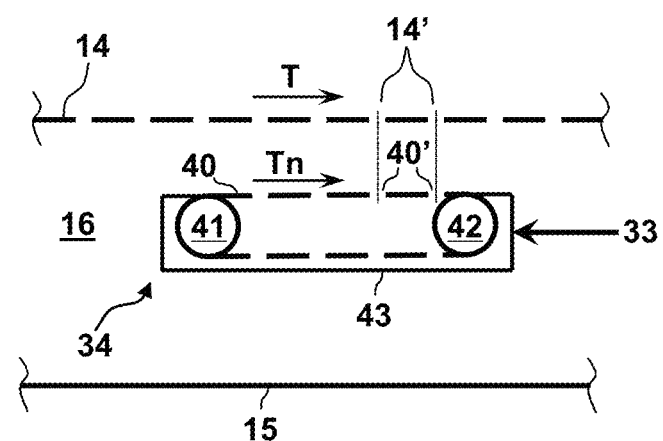

An embodiment for moving air nozzles is shown in FIG. 4. As can be seen form FIG. 4, the air nozzles 34 are formed by a belt 40 having recesses or bores 40' being spaced form each other as the bores 14' in conveyor belt 14. The belt 40 is built in a housing 43, e. g. made from sheet metal, which is attached to the pressurized air 33. The housing 43 of the air nozzles 34 is placed inside the vacuum chamber 16 of the first conveyor 10, as described above. The belt 40 is moved by rollers 41, 42 of which at least one is propelled by a drive (not shown). The belt 40 moves in a direction and speed Tn equal to the direction and speed T of the conveyor belt 14. This can be achieved by a using a drive comprising a position encoder to propel belt 40, comparable to the drive 13 and position encoder 19, as described above in conjunction with the first conveyor belt 14. It is also possible to use a synchronous gear to couple belt 40 to drive 13 of the first conveyor 10 to achieve the synchronous movement of belt 40 and first conveyor belt 14 and there-with the synchronous movement of bores 14' and 40'.

Through the air nozzles 34 and the aligned bores 14' of the conveyor belt 14 the pressurized air 34 is causing a force P against the sheet material BN'. Because of the pressurized air 34 form the air nozzles 34 the vacuum or low pressure inside the chamber 16 no longer can adhere the sheet material BN' to the conveyor belt 14 of the first conveyor 10. The force P of the pressurized air 34 moves the sheet material BN' in a direction toward the second conveyor 20 and the sheet material BN' is adhered to the conveyor belt 24 of the second conveyor 20 by the suction force S produced by vacuum or low pressure in chamber 26 of the second conveyor 20. The sheet material BN' is then transported by the second conveyor 20 in a transport direction T' different for the transport direction T of the first conveyor 10. In addition the orientation of the sheet material BN' is changed as the second conveyor 20 transports the sheet material BN' in parallel to its short edges.

In addition to the detector 31 or instead of using the detector 31 the point in time for charging the air nozzles 32 can also be calculated by the control means 30 by determining the position of the sheet material BN' on the first conveyor 10 from the known speed of transport. In addition or alternatively the signals of the position encoder 19 can be used to calculate the position of the sheet material BN' while being transported by the first conveyor 10.

The conveyors 10, 20 as described herein by example can also have a modular vacuum chamber 16, 26 design, i. e. the vacuum chamber can be separated into several sub chambers (modules). Each module having a separate housing 15' (see FIG. 1), e. g. made from sheet metal, having at least one fan. The modular design allows the built up of conveyors being flexible in length by concatenating an appropriate number of modules.

All fans 17, 27 of the vacuum chamber 16, 26 can operate permanently to produce a vacuum or low pressure. In addition it is also possible to only operate a particular fan if a vacuum is needed, i. e. if a piece of sheet material BN, BN' is at the position of the particular fan or in the vicinity of the particular fan. To only operate particular fans is especially advantageous if using the modular built up of the vacuum chamber as described above.

The conveyors 10, 20 as described herein by example can also be used as a switch for a change in the direction of movement of the sheet material, without changing the orientation of the sheet material.

The conveyor as described herein and its use for changing the direction of movement and/or orientation of sheet material can be used for banknotes being processed in banknote processing machines, e. g. banknote sorters, especially in banknote processing machines operating at high speeds of 20, 40, 50 or even more banknotes per second.

The invention claimed is:

1. A transport system for a sheet material, the system comprising:
   a conveyor belt being permeable to air by bores extending through the conveyor belt;
   a vacuum chamber provided on a first side of the conveyor belt, the vacuum chamber being configured to provide a suction force in a first direction, the suction force adhering the sheet material to a second side of the conveyor belt, the first side of the conveyor belt being opposite from the second side of the conveyor belt and the first direction being transverse to a transport direction of the conveyor belt; and
   air nozzles arranged at a deflection position inside the vacuum chamber, the air nozzles being configured to supply pressurized air through the bores of the conveyor belt in a second direction, the second direction being opposite the first direction.

2. The transport system according to claim 1, wherein at least a portion of the bores extending through the conveyor belt are spaced at a specified distance, and
   the air nozzles are spaced at a distance corresponding to the specified distance of the bores.

3. The transport system according to claim 1, further comprising an alignment detection system configured to detect an alignment of the bores in the conveyor belt with the air nozzles.

4. The transport system according to claim 3, further comprising a position detection system configured to detect a position of the sheet material being transported.

5. The transport system according to claim 4, further comprising an air supply system configured to supply the pressurized air to the air nozzles while in alignment with the bores of the conveyor belt at a time when a piece of sheet material to be deflected is located at the deflection position.

6. The transport system according to claim 3, wherein the alignment detection system comprises a position encoder that detects the position of the bores while the conveyor belt is moving.

7. The transport system according to claim 3, wherein the position detection system comprises an optical sensor.

8. The transport system according to claim 1, further comprising a second conveyor belt and a second vacuum chamber provided on a first side of the second conveyor belt, the second vacuum chamber being configured to provide a second suction force in a second direction, the second suction force adhering the sheet material to a second side of the second conveyor belt, the first side of the second conveyor belt being opposite from the second side of the second conveyor belt and the second direction being transverse to a transport direction of the second conveyor belt;
   wherein the second conveyor belt intersects the first conveyor belt at the deflection position.

9. The transport system according to claim 8, wherein the second conveyor belt is arranged sufficiently close to the first conveyor belt that the a charge of pressurized air from the air nozzles deflects a piece of sheet material from the first conveyor belt t the second conveyor belt.

10. The transport system according to claim 8, wherein the air nozzles occupy an area defined by the intersection of the conveyor belt and the additional conveyor belt.

11. The transport system for sheet material according to claim 1, wherein at least one fan is attached to a housing forming the vacuum chamber to produce the vacuum.

12. The transport system according to claim 11, wherein the housing is made from sheet metal.

13. The transport system according to claim 11, wherein the vacuum chamber comprises a modular built up structure comprising several sub-vacuum chambers, each sub-vacuum chamber having a separate housing provided with at least one fan, wherein the sub-vacuum chambers are concatenated in the direction of transport.

14. A banknote processing machine, comprising the transport system as recited in claim 1, wherein the sheet material is a banknote.

15. The transport system according to claim 9 wherein a material to be transported is transferred from the first conveyor belt to the additional conveyor belt by the charge of pressurized air provided by the air nozzles overcoming the suction force in the first caused by the vacuum chamber, the charge of pressurized air moving the material to be transported onto the second conveyor belt.

16. The transport system according to claim 15, wherein the conveyor belts are used as a switch for a change in direction of the movement of the material being transported.

17. The transport system according to claim 15, wherein the conveyor belts are used as a switch for a change in orientation of the movement of the material being transported.

* * * * *